United States Patent
Yoo et al.

(10) Patent No.: US 8,208,468 B2
(45) Date of Patent: Jun. 26, 2012

(54) METHOD FOR CONNECTING IP-BASED USN WITH CONVENTIONAL IP NETWORK

(75) Inventors: Seung-Wha Yoo, Seocho-gu (KR); Byeong-Hee Roh, Gangnam-gu (KR); Hong-Jeon Ha, Yongin-si (KR); Ki-Hyung Kim, Suwon-si (KR)

(73) Assignee: Ajou University Industry—Academic Cooperation Foundation, Suwon-si, Gyeonggi-do (KR)

( * ) Notice: Subject to any disclaimer, the term of this patent is extended or adjusted under 35 U.S.C. 154(b) by 283 days.

(21) Appl. No.: 12/525,639

(22) PCT Filed: Feb. 3, 2007

(86) PCT No.: PCT/KR2007/000588
§ 371 (c)(1),
(2), (4) Date: Aug. 3, 2009

(87) PCT Pub. No.: WO2008/096906
PCT Pub. Date: Aug. 14, 2008

(65) Prior Publication Data
US 2009/0316701 A1 Dec. 24, 2009

(51) Int. Cl.
*H04L 12/28* (2006.01)
*H04L 12/56* (2006.01)
*G06F 15/173* (2006.01)

(52) U.S. Cl. ......... 370/392; 370/389; 370/401; 709/241

(58) Field of Classification Search .......... 370/252–254, 370/255–466; 340/522–531; 709/224–238, 709/241–255
See application file for complete search history.

(56) References Cited

U.S. PATENT DOCUMENTS

| | | | |
|---|---|---|---|
| 6,816,862 B2 * | 11/2004 | Mulgund et al. | 1/1 |
| 7,119,676 B1 * | 10/2006 | Silverstrim et al. | 340/531 |
| 7,159,035 B2 * | 1/2007 | Garcia-Luna-Aceves et al. | 709/241 |
| 7,460,532 B2 * | 12/2008 | Shin et al. | 370/389 |
| 7,825,791 B2 * | 11/2010 | Kim et al. | 340/500 |
| 8,040,232 B2 * | 10/2011 | Oh et al. | 340/521 |
| 2006/0149905 A1 * | 7/2006 | Park et al. | 711/141 |
| 2008/0136708 A1 * | 6/2008 | Kim et al. | 342/367 |
| 2008/0160938 A1 * | 7/2008 | Hwang et al. | 455/132 |
| 2009/0193027 A1 * | 7/2009 | Ahn et al. | 707/9 |
| 2010/0007483 A1 * | 1/2010 | Oh et al. | 340/521 |
| 2010/0074266 A1 * | 3/2010 | Kim et al. | 370/401 |
| 2010/0128624 A1 * | 5/2010 | Lee et al. | 370/252 |
| 2011/0116414 A1 * | 5/2011 | Lee et al. | 370/254 |

* cited by examiner

*Primary Examiner* — Man Phan
(74) *Attorney, Agent, or Firm* — Sherr & Vaughn, PLLC

(57) ABSTRACT

An Internet protocol (IP)-based ubiquitous sensor network (USN) system is disclosed. The IP-based USN includes a plurality of sensor nodes having unique IP addresses and an IP-USN router. The IP-USN router has a table that stores each location address of the sensor nodes and periodically broadcasts its own presence information for updating the location addresses stored in the table. The sensor nodes in the IP-based USN system have unique IP addresses. Therefore, desired information and services from any external network may be obtained.

6 Claims, 7 Drawing Sheets

METHOD FOR CONNECTING IP-BASED USN WITH CONVENTIONAL IP NETWORK

CROSS REFERENCE TO PRIOR APPLICATION

The present application is a National Stage Application of PCT International Application No. PCT/KR2007/000588 (filed on Feb. 3, 2007), under 35 U.S.C. 371, which is hereby incorporated by reference in its entirety

TECHNICAL FIELD

The present invention relates to a ubiquitous sensor network (USN) and more particularly to communication between a conventional network and an Internet protocol (IP)-based USN.

BACKGROUND ART

The present ubiquitous era needs to be prepared for evolution to the next stage. In the next stage, a unique Internet protocol (IP) address is given to each sensor in a ubiquitous sensor network (USN), and a user can acquire desired information and services from any external network.

Research related to USNs, that is, research related to sensors and sensor networks has been conducted for a long time. A large amount of research in wireless sensor networks (WSNs) has been conducted, not only in South Korea, but also in foreign countries. The ZigBee Alliance is one of the most popular associations of companies in the USN field. ZigBee is the name of a low-power wireless networking standard. The ZigBee standard builds on the IEEE 802.15.4 standard, which specifies the physical layer and the data link layer, and defines the network layer and higher layers. ZigBee has high power efficiency, which would allow, for example, a sensor in a low-power sensor network to last for a few months on two AA-size batteries. In addition, ZigBee may constitute a personal area network (PAN) that has a greater range than Bluetooth. However, a non-IP-based network protocol is used in the network layer, and thus application adaptability is limited.

DISCLOSURE OF THE INVENTION

Technical Problem

The present invention provides a communication method of a ubiquitous sensor network (USN) including a plurality of sensor nodes and an Internet protocol (IP)-USN router managing sensor nodes and an IP-based USN system.

The present invention provides an IP-based USN connection system that is accessible from the conventional Domain Name System (DNS).

The present invention provides an IP-based multiple USN connection system that is accessible from the conventional DNS.

The present invention provides a method of providing an object information service (OIS) of a USN.

Technical Solution

Accordingly, the present invention is provided to substantially obviate one or more problems due to limitations and disadvantages of the related art.

In some embodiments of the present invention, a communication method of a ubiquitous sensor network (USN) including a plurality of sensor nodes and an Internet protocol (IP)-USN router managing sensor nodes includes: assigning a unique IP address to each of the plurality of sensor nodes; broadcasting each location address of the plurality of sensor nodes having the unique IP addresses; storing the broadcast location address in a table of the IP-USN router; and periodically broadcasting presence information of the IP-USN router for updating the location address stored in the table.

The communication method may further include transmitting and receiving a information request to/from a particular sensor node by unicast when the IP-USN router receives the information request about the particular sensor node included in the plurality of sensor nodes.

In some embodiments of the present invention, an IP-based USN system includes: a plurality of sensor nodes, each having a unique IP address; and an IP-USN router having a table that stores each location address of the plurality of sensor nodes, and periodically broadcasting its own presence information for updating the location addresses stored in the table.

In some embodiments of the present invention, an IP-based USN connection system includes: an IP-based USN system having a plurality of sensor nodes, each having a unique IP address and an IP-USN router having a table that stores each location address of the plurality of sensor nodes, and periodically broadcasting its own presence information for updating the location address stored in the table; and a USN directory system connected to the IP-USN router, the USN directory system including a directory server having protocol information and location information of the IP-based USN system.

Information about a specific sensor node of the plurality of sensor nodes may be connected based on the address of the directory server. The IP-USN router may transmit and receive an information request to/from a specific sensor node by unicast when the IP-USN router receives the information request about the specific sensor node included in the plurality of sensor nodes through a Domain Name System (DNS).

In some embodiments of the present invention, an IP-based multiple USN connection system includes: a first IP-based USN system having a first plurality of sensor nodes, which have unique first IP addresses, and a first IP-USN router having a first table that stores each location address of the first plurality of sensor nodes, and periodically broadcasting its own presence information for updating the location address stored in the first table; a second IP-based USN system having a second plurality of sensor nodes, which have unique second IP addresses different from the first IP addresses, and an IP-USN router having a second table that stores each location address of the second plurality of sensor nodes, and periodically broadcasting its own presence information for updating the location address stored in the second table; a USN directory system connected to the first IP-USN router and the second IP-USN router, the USN directory system including a directory server having protocol information and location information of the first IP-based USN system and the second IP-based USN system.

The first IP-based USN system and the second IP-based USN system may use different service protocols.

In some embodiments of the present invention, an IP-based multiple USN connection system includes: a first IP-based USN system having a first plurality of sensor nodes, which have unique first IP addresses, and an IP-USN router having a first table that stores each location address of the first plurality of sensor nodes, and periodically broadcasting its own presence information for updating the location address stored in the first table; an second IP-based USN system having a second plurality of sensor nodes, which have unique second IP addresses different from the first IP addresses, sharing the IP-USN router, and storing each location address of the second plurality of sensor nodes in a second table included in the IP-USN; and a USN directory system connected to the IP-USN router, the USN directory system including a directory server having protocol information and location information of the first IP-based USN system and the second IP-based USN system.

The first IP-based USN system and the second IP-based USN system may use different service protocols.

In some embodiments of the present invention, a method of providing an object information service (OIS) of a USN includes: (a) querying a local server by transmitting a USN uniform resource locator (URL) for obtaining information of a desired sensor node; (b) querying of a first local object directory server (ODS) by converting the transmitted USN URI to a domain name by the queried local server; (c) querying of a national ODS by the first local ODS to find the location of a corresponding information server; (d) transmitting of the address of a second local ODS in the form of an address (A) record by the national ODS, the second local ODS managing the corresponding information server; (e) querying of the second local ODS again for the location of the information server related to a corresponding code, in the form of a DNS query by the first local ODS; (f) transmitting of a Naming Authority Pointer (NAPTR) record to the information server to the first local ODS by the second local ODS; (g) transmitting the received NAPTR record to the local server; (h) receiving of the information of the desired sensor node by discovering the location of the information server in the NAPTR record and connecting to the information server by the local server; (i) transmitting the information of the desired sensor node to the local server; and (j) transmitting of the information of the desired sensor node externally by the local server.

The query in step (c) may be performed at the company level.

BRIEF DESCRIPTION OF THE DRAWINGS

The above and other advantages of the present invention will become more apparent by describing in detail example embodiments thereof with reference to the accompanying drawings, in which.

BEST MODE FOR CARRYING OUT THE INVENTION

Figure 1:
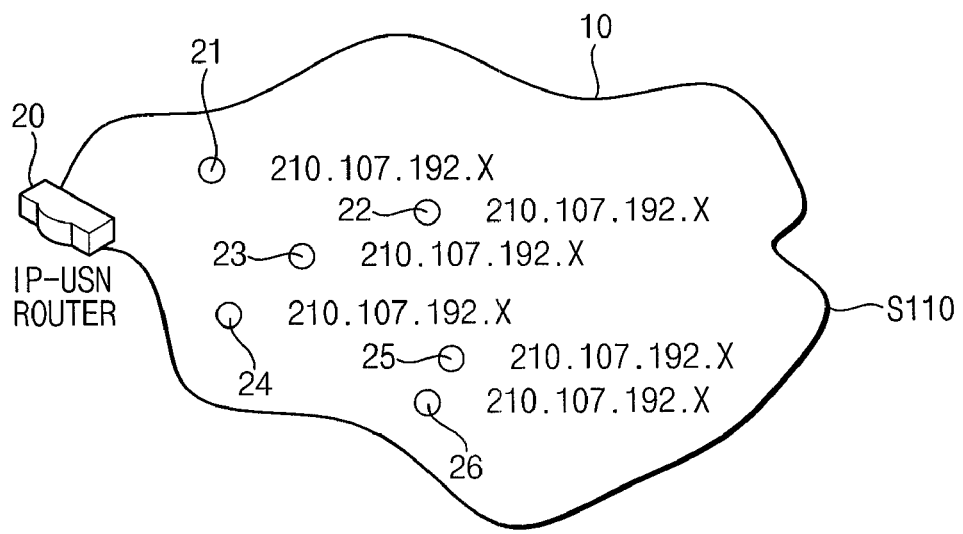
FIGS. 1 through 4 are diagrams illustrating an Internet protocol (IP)-based ubiquitous sensor network (USN) system according to an example embodiment of the present invention.

Embodiments of the present invention now will be described more fully with reference to the accompanying drawings, in which embodiments of the invention are shown. The present invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components. but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A ubiquitous environment means an environment in which users may simultaneously access services and information provided from various devices from anywhere and at anytime using the network. For implementing the ubiquitous network, the various devices are required to be connected with various communicable sensors for easily constructing a network, and a service finding system is required for finding the location of a required service such that the desired service may be provided to the users.

The service discovery protocol is an essential technical element to the ubiquitous environment, because the service discovery protocol may provide convenient service usage functions to the users by providing location information of a network for accessing a corresponding device, searching for the desired service through identifiers of the devices that provide types of services and the services themselves, and discriminating between various terminals corresponding to the same service.

The service discovery protocol has been developed for a long time and related research is continuously being conducted. Examples of the service discovery protocol may include the Bluetooth Service Discovery Protocol (SDP), the Service Location Protocol (SLP) developed by the Internet Engineering Task Force (IETF), Universal Plug and Play (UPnP) developed by the UPnP Forum, Jini developed by Sun, etc.

The Uniform Resource Locator (URL) is a means for identifying locations of many servers for acquiring required information from the many servers on the Internet. The URL includes the type of service, the location of the server and the location of a file. In general, the URL is represented as "protocol://computer name having information/directory name/file name."

The Internet informs a user of the location of a target server using the Domain Name System (DNS) and mapping the URL to an IP address.

When the above-mentioned URL system is applied to the USN, information of a particular location sensor required by the USN environment may not be provided. Thus, when the user wants to access a sensor node of the USN environment, the user needs to know the IP address of the sensor node. However, a future USN environment may include a lot of sensor nodes, and thus, a user may not be able to memorize the IP addresses of a lot of sensor nodes. Therefore, the USN environment requires a URL system such as the Internet, so that users may easily use location information of the sensor nodes. Devices employing the above-mentioned service discovery protocol may provide a service within a frequency bandwidth supported by the sensor nodes, and thus the user using an external network such as the Internet may not be able to obtain information of nodes in the USN of a desired location. For solving these problems, there is a need for nodes in the USN to be IP-based, and there is a need for a system that manages location information of nodes in a specific domain.

FIGS. 1 through 4 are diagrams illustrating an IP-based USN system according to an example embodiment of the present invention.

In FIGS. 1 through 4, a notation such as 210.107.192.X represents a unique IP address assigned to each sensor node, and the unique IP addresses are different from one another.

Referring to FIG. 1, an IP-based USN system includes a plurality of sensor nodes 21 to 26 having unique IP addresses and an IP-USN router 20.

Figure 3:
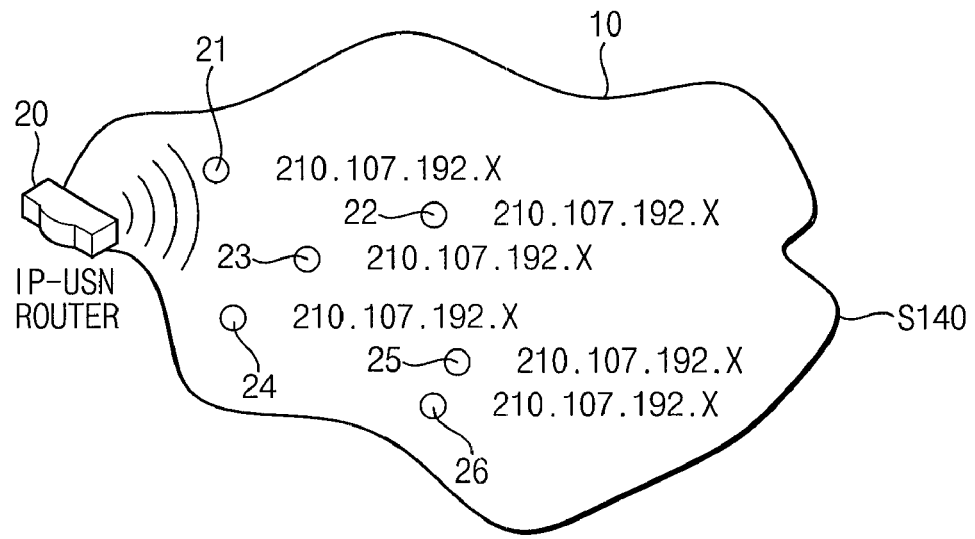

Referring to FIG. 3, the sensor nodes 21 to 26 broadcast location addresses respectively, and the IP-USN router 20 has a table (not illustrated) that stores each location address of the sensor nodes 21 to 26, and periodically broadcasts its own presence information for updating the location addresses stored in the table.

Figure 4:
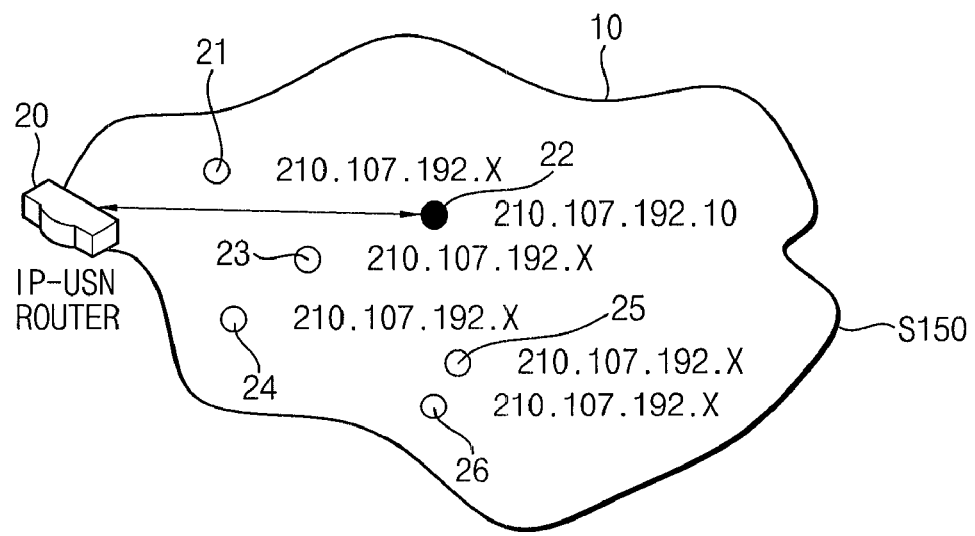

Referring to FIG. 4, the IP-USN router 20 transmits and receives an information request to/from a specific sensor node 22 by unicast when the IP-USN router 20 receives the information request about the specific sensor node 22.

Referring again to FIGS. 1 through 4, there will be a description about a communication method of USN including a plurality of sensor nodes and IP-USN router managing the sensor nodes.

A communication method of USN including a plurality of sensor nodes and IP-USN router managing the sensor nodes, includes assigning a unique IP address to each of the plurality of sensor nodes (step S110), broadcasting each location address of the plurality of sensor nodes having the unique IP addresses (step S120), storing the broadcast location address in a table of the IP-USN router (step S130) and periodically broadcasting presence information of the IP-USN router for updating the location address stored in the table (step S140). In addition, the communication method may further include transmitting and receiving a information request to/from a particular sensor node by unicast when the IP-USN router receives the information request about the particular sensor node included in the plurality of sensor nodes (step S150).

In step S110, the unique IP addresses 210.107.192.X are assigned to the plurality of sensor nodes 21 to 26 as illustrated in FIG. 1. The value of X in the IP addresses 210.107.192.X is different according to the sensor nodes 21 to 26, and thus, the IP addresses are different from one another.

Figure 2:
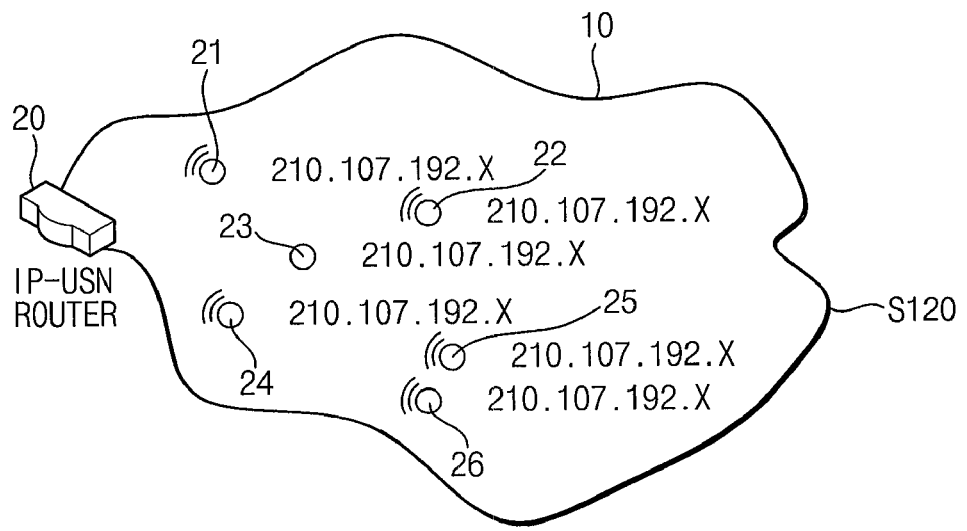

In step S120, each of the sensor nodes 21 to 26 broadcast their own location information as illustrated in FIG. 2.

In step S130, the IP-USN router 20 stores broadcast location addresses from the sensor nodes 21 to 26 in a table (not illustrated in FIG. 2).

In step S140, the IP-USN router 20 periodically broadcasts its own presence information for updating the location addresses stored in the table. The sensor nodes 21 to 26 have mobility, and thus, the locations of the sensor nodes 21 to 26 in the network vary as time goes by. Therefore, location information of the sensor nodes 21 to 26 may vary as time goes by. The IP-USN router 20 periodically broadcasts its own presence information, and the sensor nodes 21 to 26 receive the presence information of the IP-USN router 20, and broadcast their location information again.

In step S150, the IP-USN router 20 transmits and receives an information request to/from a specific sensor node 22 by unicast with the sensor node 22 when the IP-USN router 20 receives the information request about the specific sensor node 22.

The presently-used DNS is a distributed database, and a portion of the overall database may be locally controlled, and the data may be used through the overall network using a client-server method. A program called a "name server" corresponds to the server in the client-server structure. The name server includes information about a portion of the overall database, and provides the information to the client called a "resolver." In general, the resolver means a library routine that generates a query and transmits the query to a server through a network. When a sensor node in the newly-added USN is accessed, a new system is required in the DNS.

Figure 5:
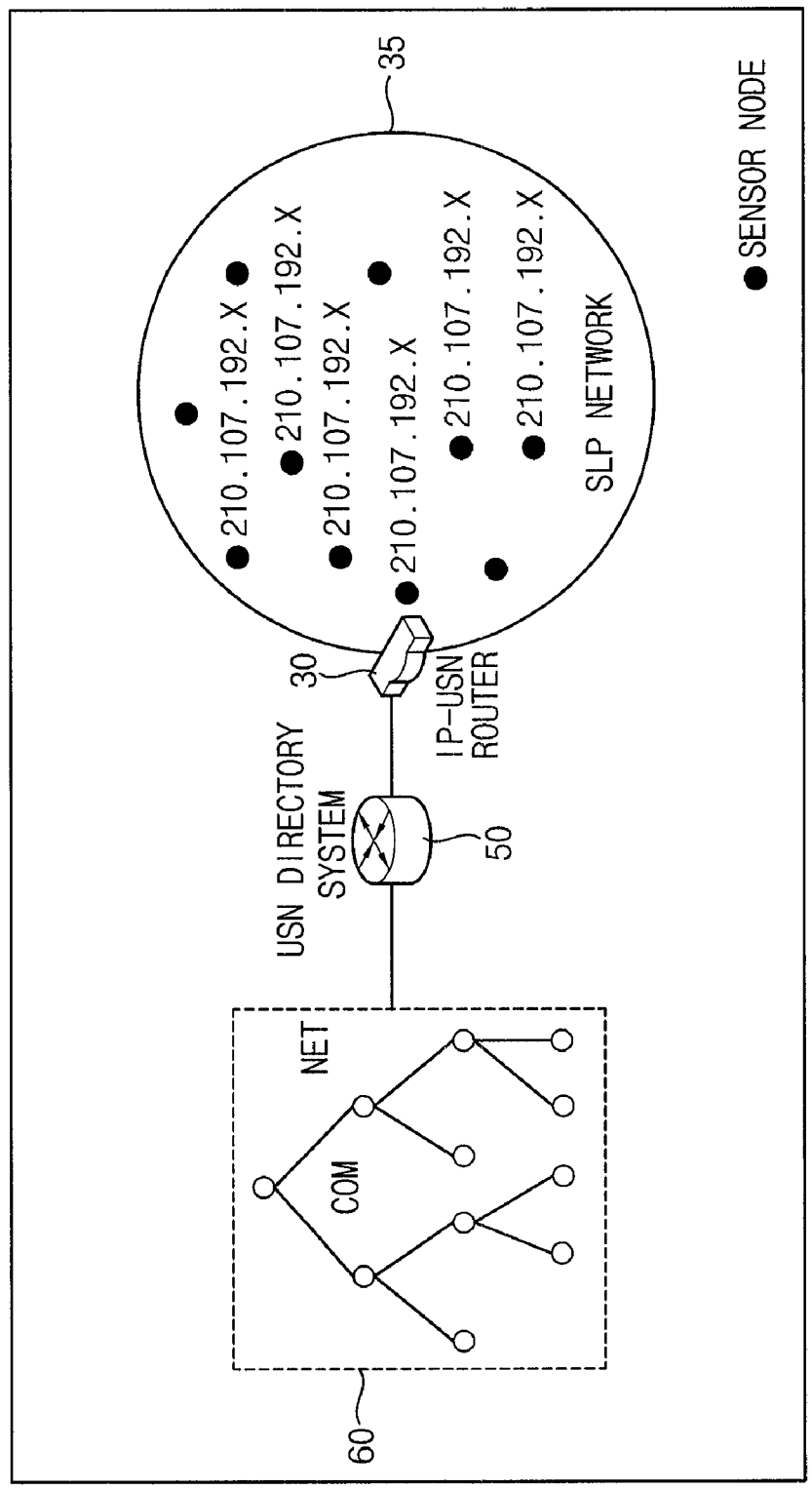
FIG. 5 is a diagram illustrating an IP-based USN connection system according to an example embodiment of the present invention.

FIG. 5 is a diagram illustrating an IP-based USN connection system according to an example embodiment of the present invention.

Referring to FIG. 5, an IP-based USN connection system includes an IP-based USN system 35, and a USN directory system 50.

The IP-based USN system 35 includes a plurality of sensor nodes having unique IP addresses 210.107.192.X. The IP-USN router 30 has a table (not illustrated) that stores each location address of the sensor nodes and periodically broadcasts its own presence information for updating the location addresses stored in the table. The USN directory system 50 is connected to the IP-USN router 30, and includes a director server having protocol information and location information of the IP-based USN system 35. The USN directory system 50 may be arranged in the lowest layer in a conventional DNS system 60. Information of the specific sensor node of the plurality of sensor nodes may be accessed based on the address of the directory server.

Figure 6:
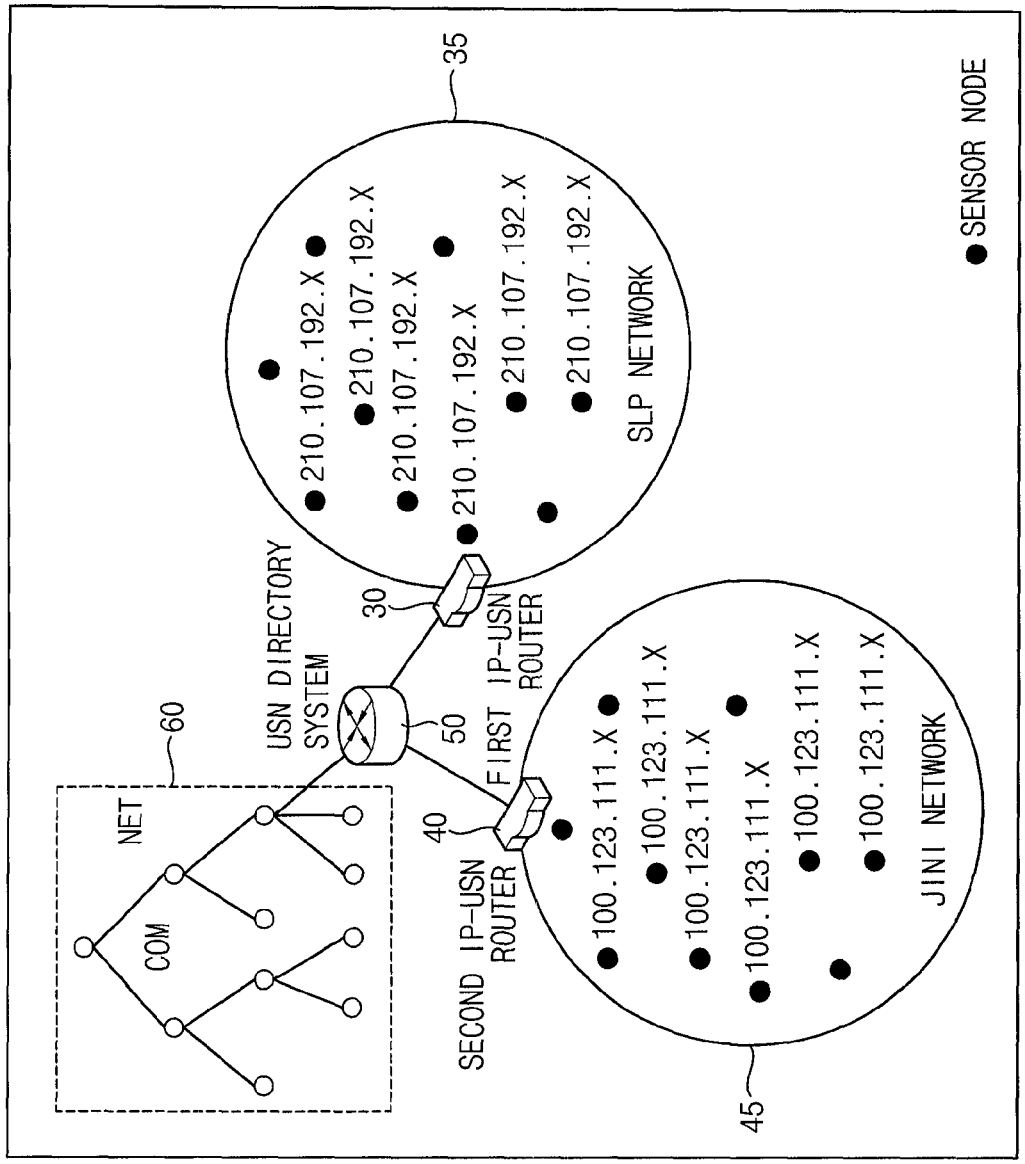
FIG. 6 is a diagram illustrating an IP-based multiple USN connection system according to an example embodiment of the present invention.

FIG. 6 is a diagram illustrating an IP-based multiple USN connection system according to an example embodiment of the present invention.

Referring to FIG. 6, an IP-based multiple USN connection system includes a first IP-based USN system 35, a second IP-based USN system 45, and a USN directory system 50.

The first IP-based USN system 35 includes a first plurality of sensor nodes having unique first IP addresses 210.107.192.X, and a first IP-USN router 30 that includes a first table (not illustrated) that stores each location address of the first plurality of sensor nodes. The first IP-USN router 30 periodically broadcasts its own presence information for updating the location address stored in the first table.

The second IP-based USN system 45 includes a first plurality of sensor nodes having unique second IP addresses 100.123.111.X different from the first IP addresses, and a second IP-USN router 40 that includes a first table (not illustrated) that stores each location address of the first plurality of sensor nodes. The second IP-USN router 40 periodically broadcasts its own presence information for updating the location address stored in the second table.

The USN directory system 50 is connected to the first IP-USN router 30 and the second IP-USN router 40. The USN directory system 50 includes a directory server (not illustrated) having protocol information and location information of the first IP-based USN system 35 and the second IP-based USN system 45. The USN directory system 50 may be arranged in the lowest layer in the conventional DNS system 60.

The first IP-based USN system 35 and the second IP-based USN system 45 may use different service protocols. The first IP-based USN system 35 may be an SLP network and the second IP-based USN system 45 may be a Jini network.

Figure 7:
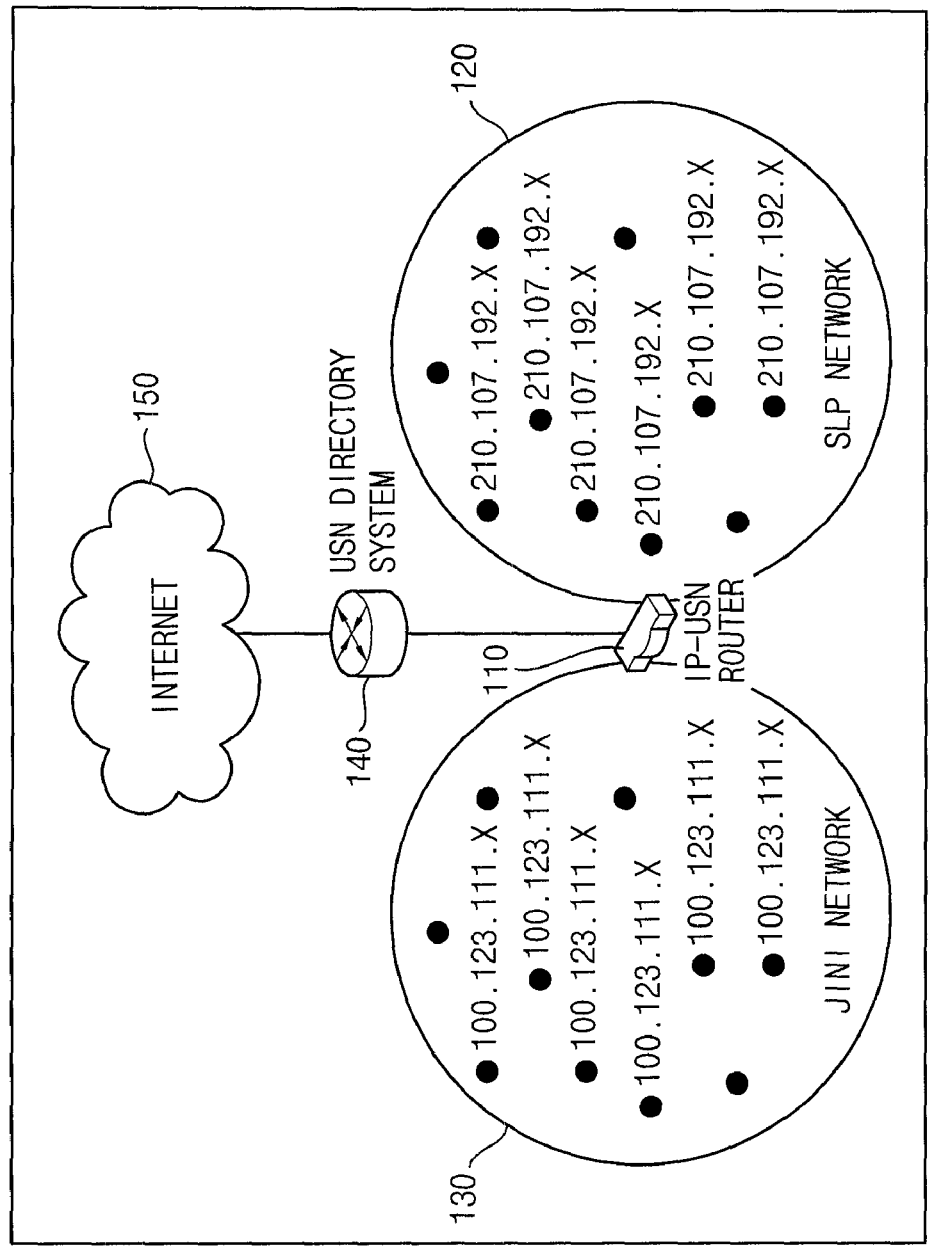
FIG. 7 is a diagram illustrating an IP-based multiple USN connection system according to another example embodiment of the present invention.

FIG. 7 is a diagram illustrating an IP-based multiple USN connection system according to another example embodiment of the present invention.

Referring to FIG. 7, an IP-based multiple USN connection system includes a first IP-based USN system 120, a second IP-based USN system 130, and a USN directory system 140.

The first IP-based USN system 120 includes a first plurality of sensor nodes having unique first IP addresses 210.107.192.X, and an IP-USN router 110 that includes a first table (not illustrated) that stores each location address of the first plurality of sensor nodes. The IP-USN router 110 periodically broadcasts its own presence information for updating the location address stored in the first table.

The second IP-based USN system 130 includes a second plurality of sensor nodes having unique second IP addresses 100.123.111.X different from the first IP addresses. The second IP-based USN system 130 shares the IP-USN router 110 with the first IP-based USN system 120, and stores each location address of the first plurality of sensor nodes in a second table included in the IP-USN router 110.

The USN directory system 140 is connected to the IP-USN router 110. The USN directory system 110 includes a directory server (not illustrated) having protocol information and location information of the first IP-based USN system 120 and the second IP-based USN system 130. The USN directory system 140 may be connected to a conventional network such as the Internet. The first IP-based USN system 120 and the second IP-based USN system 130 may use different service protocols. The first IP-based USN system 120 may be an SLP network and the second IP-based USN system 130 may be a Jini network.

Figure 8:
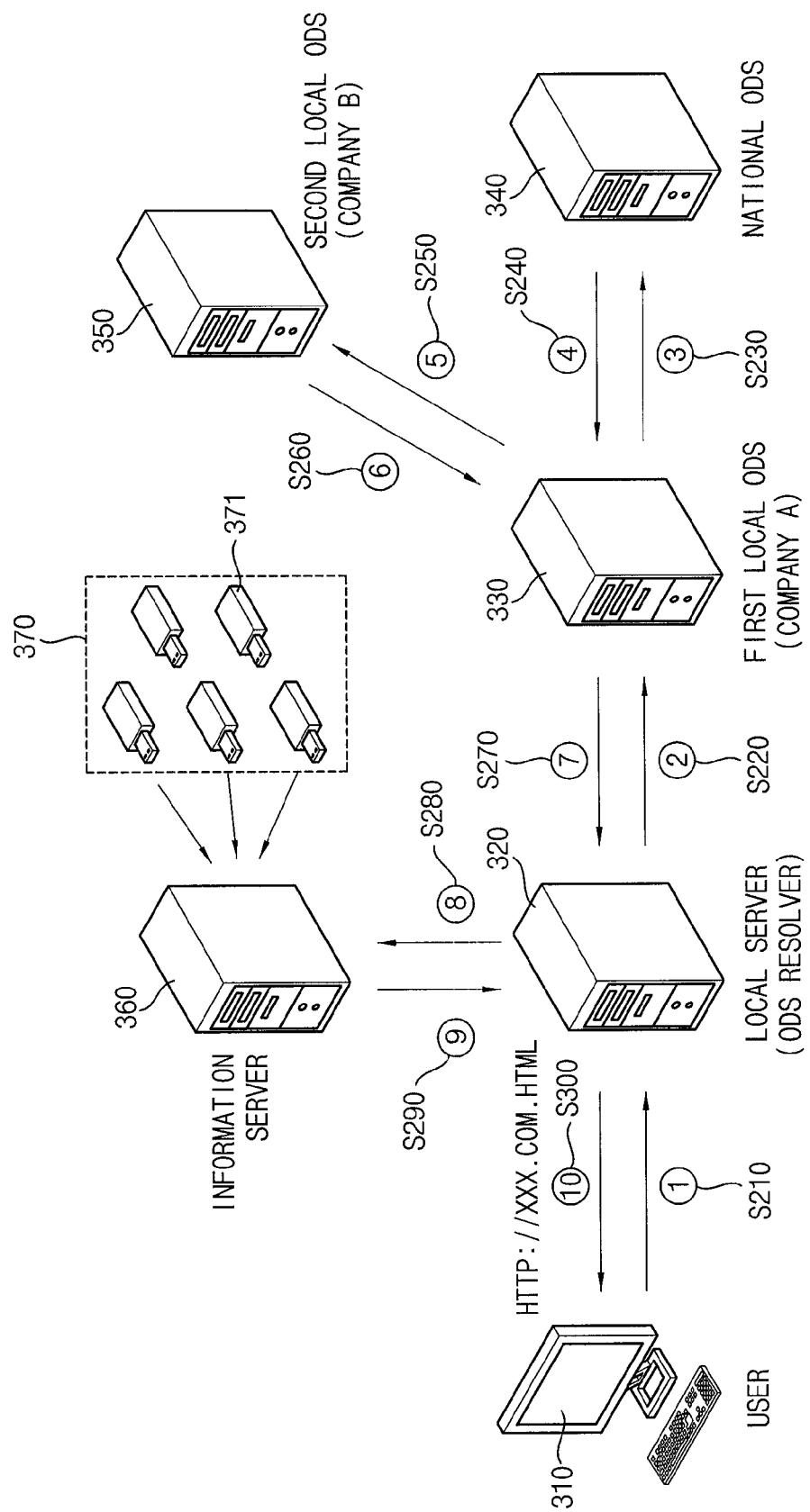
FIG. 8 is a diagram illustrating a method of providing an object information service (OIS) of a USN according to an example embodiment of the present invention.

FIG. 8 is a diagram illustrating a method of providing an object information service (OIS) of a USN according to an example embodiment of the present invention.

Referring to FIG. 8, a method of providing an OIS of a USN includes querying a local server by transmitting a USN uniform resource locator (URL) for obtaining information of a desired sensor node (step S210), querying of a first local object directory server (ODS) by converting the transmitted USN URL to a domain name by the queried local server (step S220), querying of a national ODS by the first local ODS to find the location of a corresponding information server (step S230), transmitting of the address of a second local ODS in the form of an address (A) record by the national ODS, the second local ODS managing the corresponding information server (step S240), querying of the second local ODS again for the location of the information server related to a corresponding code, in the form of a DNS query by the first local ODS (step S250), transmitting of a Naming Authority Pointer (NAPTR) record to the information server to the first local ODS by the second local ODS (step S260), transmitting the received NAPTR record to the local server (step S270), receiving of the information of the desired sensor node by discovering the location of the information server in the NAPTR record and connecting to the information server by the local server (step S280), transmitting the information of the desired sensor node to the local server (step S290) and transmitting of the information of the desired sensor node externally by the local server (step S300).

In step S210, when information about a specific sensor node 371 among a plurality of sensor nodes 370 is required through a user's computer 310, the USN URL is transmitted to a local server 320. In step S220, the local server 320 converts the USN URL of the specific sensor node 371 to a domain name, and queries a first local ODS 330. In step S230, the first local ODS 330 queries a national ODS 340 to find a corresponding information server. The query in step S230 may be performed at the company level. In step S240, the national ODS 340 transmits the address of a second local ODS 350 that manages the corresponding information server in the form of an A record. In step S250, the first local ODS 330 queries the second local ODS again for the location of the information server 360 related to a corresponding code, in the form of a DNS query. In step S260, the second local ODS 350 transmits an NAPTR record to the first local ODS 330.

Here, the ODS provides a service of searching for sensor nodes, and the ODS includes a national ODS and a local ODS.

Figure 9:
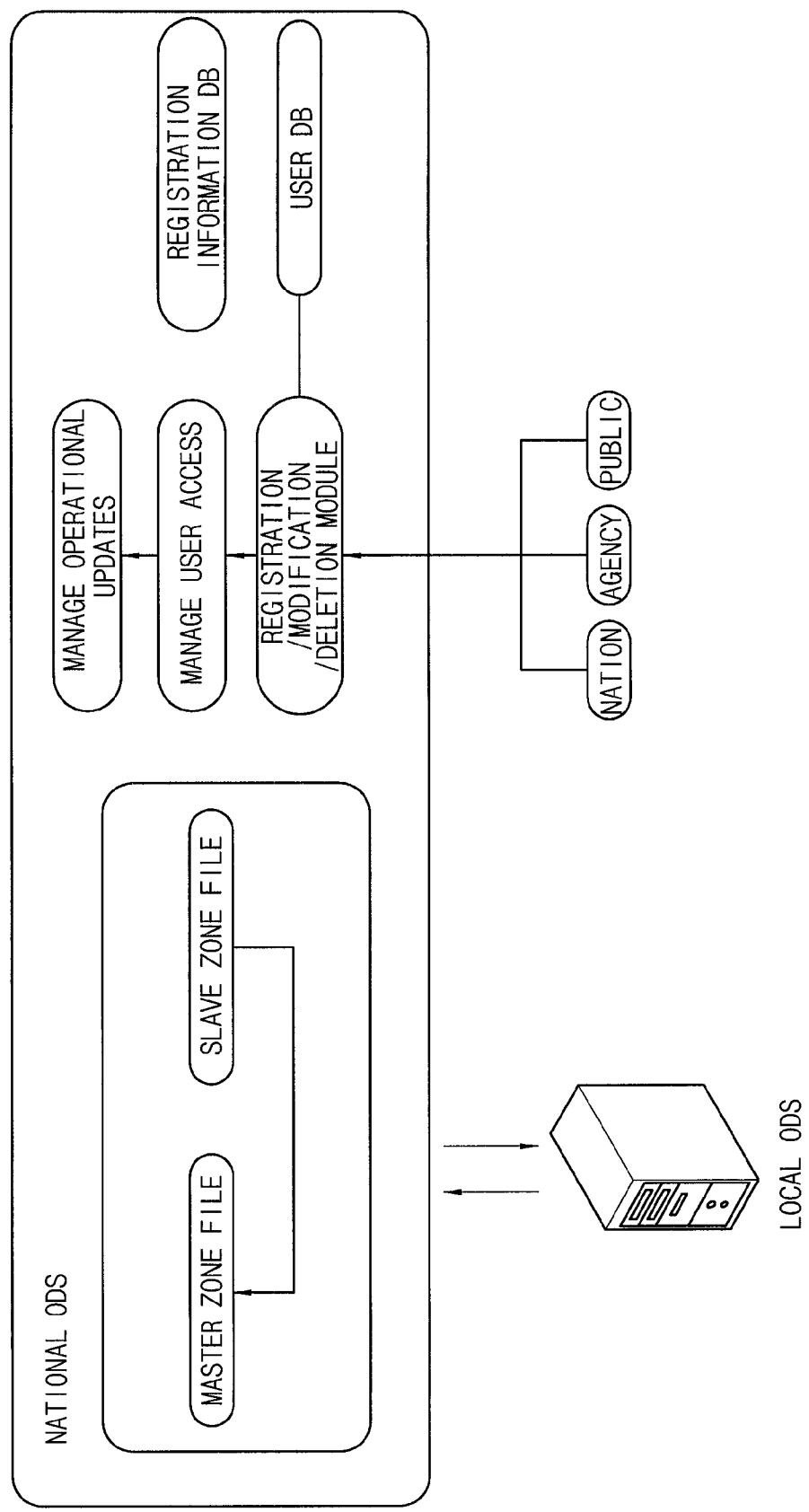
FIG. 9 is a diagram illustrating the architecture of a national object directory server (ODS).

FIG. 9 is a diagram illustrating the architecture of a national ODS.

The national ODS is a national sensor node search service, and the national ODS manages information files about the location of a local ODS of each agency, and provides a service for the information of the location of the local ODS. That is, the national ODS provides location information of the local ODS in the form of the DNS. The location information of the local ODS is implemented with Berkeley Internet Name Domain (BIND), and a Master Zone file and a Slave Zone file include information for performing a BIND search. The national ODS has access levels according to users, and periodically performs operational updates. In addition, the national ODS includes a registration/modification/deletion module, and properly processes the URL corresponding to each code information.

The local ODS is located in a network of the agency, and the agency manages its own local ODS. The local ODS manages zone files of the location information of an OIS and an object traceability service (OTS) belonging to each agency, and provides a service for the location information of the OIS and OTS. For this purpose, the local ODS is entrusted with a sensor node zone from the national ODS.

When the user inputs a radio-frequency identification (RFID) code, the local ODS searches the national ODS, processes the search results, and returns a URL at which the information related to the corresponding code is located. When the information related to the RFID code inputted by the user is in the OIS of the agency belonging to the ODS, the local ODS directly returns the URL of the OIS without querying the national ODS.

Referring again to FIG. 8, in step S270, the first local ODS 330 transmits the received NAPTR record to the local server 320. In step S280, the local server 320 discovers the location of the information server 360 in the received NAPTR record, connects to the information server, and discovers information of the specific sensor node 371. In step S290, the information server 360 transmits the information of the specific sensor node 371 to the local server 320. In step S300, the local server 320 transmits the received information of the specific sensor node 371 to the user's computer 310 again.

Industrial Applicability

According to example embodiments of the present invention, sensor nodes in an IP-based USN system have unique IP addresses. Therefore, desired information and services from any external network may be obtained.

While the present invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims.

The invention claimed is:

1. An Internet protocol (IP) based multiple ubiquitous sensor network (USN) connection system comprising:
   a first IP-based USN system having a first plurality of sensor nodes, which have unique first IP addresses, and a first IP-USN router having a first table that stores each location address of the first plurality of sensor nodes, and periodically broadcasting its own presence information for updating the location address stored in the first table;
   a second IP-based USN system having a second plurality of sensor nodes, which have unique second IP addresses different from the first IP addresses, and a second IP-USN router having a second table that stores each location address of the second plurality of sensor nodes, and periodically broadcasting its own presence information for updating the location address stored in the second table; and
   a USN directory system connected to the first IP-USN router and the second IP-USN router, the USN directory system including a directory server having protocol information and location information of the first IP-based USN system and the second IP-based USN system.

2. The IP-based multiple USN connection system of claim 1, wherein the first IP-based USN system and the second IP-based USN system use different service protocols.

3. An Internet protocol (IP) based multiple ubiquitous sensor network (USN) connection system comprising:
   a first IP-based USN system having a first plurality of sensor nodes, which have unique first IP addresses, and an IP-USN router having a first table that stores each location address of the first plurality of sensor nodes, and periodically broadcasting its own presence information for updating the location address stored in the first table;
   an second IP-based USN system having a second plurality of sensor nodes, which have unique second IP addresses different from the first IP addresses, sharing the IP-USN router, and storing each location address of the second plurality of sensor nodes in a second table included in the IP-USN router; and
   a USN directory system connected to the IP-USN router, the USN directory system including a directory server having protocol information and location information of the first IP-based USN system and the second IP-based USN system.

4. The IP-based multiple USN connection system of claim 3, wherein the first IP-based USN system and the second IP-based USN system use different service protocols.

5. A method of providing an object information service of an ubiquitous sensor network (USN), the method comprising:
   (a) querying a local server by transmitting a USN uniform resource locator (URL) for obtaining information of a desired sensor node;
   (b) querying of a first local object directory server (ODS) by converting the transmitted USN URL to a domain name by the queried local server;
   (c) querying of a national ODS by the first local ODS to find the location of a corresponding information server;
   (d) transmitting the address of a second local ODS in the form of an address record by the national ODS, the second local ODS managing the corresponding information server;
   (e) querying of the second local ODS again for the location of the information server related to a corresponding code, in the form of a Domain Name System query by the first local ODS;
   (f) transmitting of a Naming Authority Pointer (NAPTR) record to the information server to the first local ODS by the second local ODS;
   (g) transmitting the received NAPTR record to the local server;
   (h) receiving of the information of the desired sensor node by discovering the location of the information server in the NAPTR record and connecting to the information server by the local server;
   (i) transmitting the information of the desired sensor node to the local server; and
   (j) transmitting of the information of the desired sensor node externally by the local server.

6. The method of claim 5, wherein the query in step (c) may be performed at the company level.

* * * * *